(12) United States Patent
Reynolds et al.

(10) Patent No.: US 9,628,520 B2
(45) Date of Patent: Apr. 18, 2017

(54) METHODS AND SYSTEMS FOR CONTROLLING SETUP OF CALLS THROUGH COMMUNICATION SYSTEMS

(71) Applicant: TELEFONAKTIEBOLAGET L M ERICSSON (PUBL), Stockholm (SE)

(72) Inventors: Jennifer Ann Reynolds, Duluth, GA (US); Chris Phillips, Hartwell, GA (US); Bob Forsman, Sugar Hill, GA (US); Charles Hammett Dasher, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 515 days.

(21) Appl. No.: 13/626,313

(22) Filed: Sep. 25, 2012

(65) Prior Publication Data

US 2014/0086235 A1    Mar. 27, 2014

(51) Int. Cl.

| | |
|---|---|
| *H04L 12/66* | (2006.01) |
| *H04L 29/06* | (2006.01) |
| *H04L 29/08* | (2006.01) |
| *H04L 29/12* | (2006.01) |
| *H04M 3/42* | (2006.01) |
| *H04M 3/436* | (2006.01) |

(52) U.S. Cl.
CPC ........ *H04L 65/1069* (2013.01); *H04L 61/106* (2013.01); *H04L 67/306* (2013.01); *H04M 3/42008* (2013.01); *H04M 3/4211* (2013.01); *H04M 3/436* (2013.01); *H04L 61/3065* (2013.01); *H04L 61/605* (2013.01); *H04M 2203/152* (2013.01)

(58) Field of Classification Search
CPC ............ H04L 65/1069; H04L 65/1016; H04L 61/106; H04L 61/3065; H04L 61/605; H04L 67/306; H04M 3/436; H04M 3/42008; H04M 7/12
See application file for complete search history.

(56) References Cited

U.S. PATENT DOCUMENTS 5,590,184 A  *  12/1996  London ................... H04M 1/57
                                                          379/142.09
6,639,973 B1    10/2003  Wheeler et al.
(Continued)

FOREIGN PATENT DOCUMENTS

WO    WO 2007/080422 A1    7/2007
WO    WO 2012/007018 A1    1/2012

OTHER PUBLICATIONS

Net2phone, "Call Blocking", Apr. 28, 2004.*

*Primary Examiner* — Khaled Kassim
*Assistant Examiner* — Zhaohui Yang

(57) ABSTRACT

A method by at least one network node is disclosed for controlling setup of calls through a communication system. Information is received for a call request that comprises a network address of an origination device of the call request and a virtual identifier associated with a destination device to which the incoming call is directed. A user call profile is retrieved from among a plurality of user call profiles in a user call profile repository using the virtual identifier to identify the user call profile. The user call profile includes a plurality of rules defined by the user for controlling setup of calls to the destination device. Setup of a call path between the origination device and the destination device is controlled responsive to the user call profile.

7 Claims, 11 Drawing Sheets

(56) References Cited

U.S. PATENT DOCUMENTS

| | | | |
|---|---|---|---|
| 6,937,713 B1* | 8/2005 | Kung | H04M 3/54 379/199 |
| 8,693,655 B1* | 4/2014 | Chau | H04M 3/42008 379/201.01 |
| 2005/0032546 A1* | 2/2005 | Kehr | H04M 3/42008 455/551 |
| 2006/0072726 A1* | 4/2006 | Klein et al. | 379/201.01 |
| 2007/0047547 A1* | 3/2007 | Conner et al. | 370/392 |
| 2007/0121879 A1* | 5/2007 | McGary et al. | 379/218.01 |
| 2008/0240081 A1 | 10/2008 | Sindhwani | |
| 2010/0080376 A1* | 4/2010 | Hartley et al. | 379/211.02 |
| 2010/0150138 A1* | 6/2010 | Bjorsell et al. | 370/352 |
| 2010/0166166 A1 | 7/2010 | Smith et al. | |
| 2011/0069661 A1 | 3/2011 | Waytena, Jr. et al. | |
| 2013/0259229 A1* | 10/2013 | Thumparthy | 380/247 |

\* cited by examiner

METHODS AND SYSTEMS FOR CONTROLLING SETUP OF CALLS THROUGH COMMUNICATION SYSTEMS

TECHNICAL FIELD

The present invention generally relates to communication systems, and more particularly to systems and methods for setup of calls through a communication system between communication devices.

BACKGROUND

For traditional phone systems, people give out their phone number to anyone they wish to communicate with them at a later date, even if they only wish to communicate with the other person in a limited fashion or for a limited time (personal date, temporary business relationship, internet friends, etc). If a person wishes to avoid further communications from a particular person, the person can use a call blocking service to block calls but only if the other person's telephone number(s) are known. Alternatively, the person can cancel the current phone number and obtain a new number that is then provided to everyone who the people desires to receive calls from.

SUMMARY

It is therefore be an object to address at least some of the above mentioned disadvantages and/or to provide other improved control over the setup of calls through communication systems.

Various embodiments provide a method by at least one network node for controlling setup of calls through a communication system. The method includes receiving information for a call request that includes a network address of an origination device of the call request and a virtual identifier associated with a destination device to which the incoming call is directed. A user call profile is retrieved from among a plurality of user call profiles in a user call profile repository using the virtual identifier to identify the user call profile. The user call profile includes a plurality of rules defined by the user for controlling setup of calls to the destination device. Setup of a call path between the origination device and the destination device is controlled responsive to the user call profile.

The virtual identifier is translated to a network address of the destination device and the call path is setup between the origination device and the destination device using the network address, in response to determining that the plurality of rules of the user call profile are satisfied.

A potential advantage of this approach is that although the user publicly discloses the virtual identifier for the destination device, the system masks from other persons how the virtual identifier is mapped to the network address of the destination device for communication through a public switched telephone network or packet switched network. Masking such mapping enables the user to maintain a high level of anonymity and, furthermore, enables the user to more easily control or terminate the ability of one person to call a disabled virtual identifier for the destination device without affecting the ability of other persons to call other virtual identifiers for the destination device.

Other embodiments provide a method by a user device for controlling setup of calls through a communication system. The method includes receiving information for a call request that includes a network address of an origination device of the call request. A plurality of rules of a user call profile, which is stored in the user device, are retrieved. The plurality of rules are defined by the user for controlling setup of calls to the user device. A determination is made as to whether the plurality of rules of the user call profile are satisfied by the call request having the network address of the origination device. Responsive to the plurality of rules of the user call profile being satisfied, setup of a call path between the user device and the origination device is controlled using the network address.

Other methods and apparatuses according to embodiments of the invention will be or become apparent to one with skill in the art upon review of the following drawings and detailed description. It is intended that all such additional methods and apparatuses be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

The present invention now will be described more fully hereinafter with reference to the accompanying drawings, in which embodiments of the invention are shown. However, this invention is not to be construed as limited to the embodiments set forth herein.

Some embodiments are directed one or more network nodes that control the setup of telephone calls through a communication system. The network node (e.g., a server, a router, or other device) can control routing of telephone calls to a subscriber's Plain Old Telephone System (POTS) phone through a public switched telephone network and/or to a subscriber's network device (e.g., computer, data terminal, etc.) through a packet switched network using virtual identifiers that a subscriber (user) publicly discloses to other persons. Although the subscriber publicly discloses the virtual identifiers, the system masks from the other persons how the virtual identifiers are mapped to the telephone number or other network addresses (e.g., media access control address, Ethernet address, etc.) assigned to the subscriber's device (POTS phone, network device, etc.). By masking the mapping from publicly disclosed virtual identifiers to the subscriber's device, the subscriber can maintain a high level of anonymity and, furthermore, can more easily control or terminate the ability of one person to call without affecting the ability of other persons to call.

The network node can operate to enable a subscriber to define call profiles that are used to control setup of calls to the subscriber's device by one or more identified persons. The network node can enable the subscriber to manage the virtual identifiers (which may be traditional POTS telephone numbers, user names, etc) by, for example, enabling or disabling entire identities, and/or defining black lists (i.e., list of telephone number of calling devices that are prohibited from calling the subscriber's device) and/or defining white lists (i.e., list of telephone number of calling devices that are permitted to call the subscriber's device). The call profiles can define rules for blocking calls from individual blacklisted telephone numbers (e.g., to stop a harassing call originating from an identified telephone number) and/or rules for selectively blocking any incoming call according to defined conditions (e.g., not allowing calls during a defined timeframe).

Figure 1:
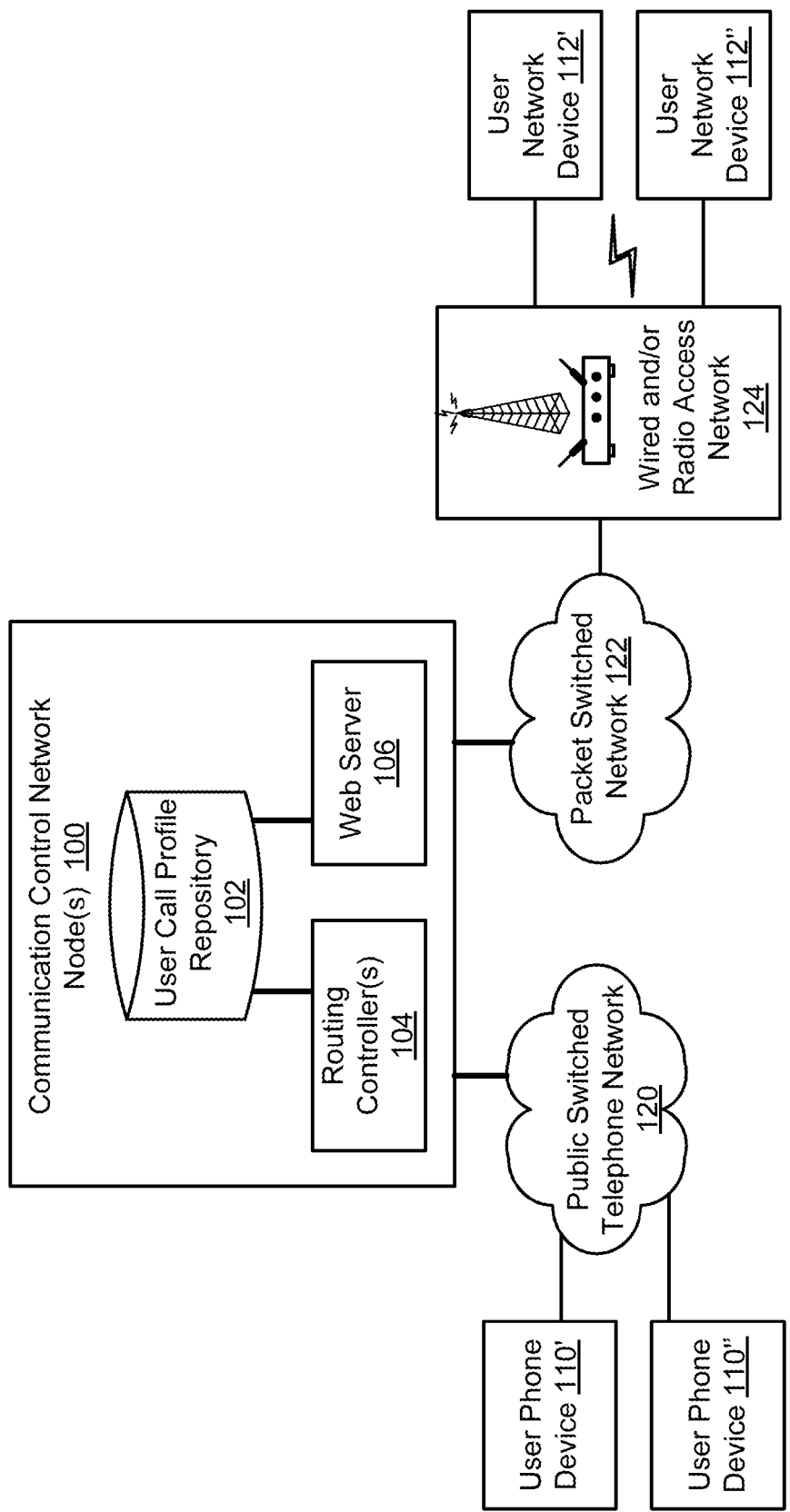
FIG. 1 is a block diagram of a communications system according to some embodiments.

FIG. 1 is a block diagram of a communications system according to some embodiments. The system includes one or more communication control nodes 100 that setup telephone calls between user devices that are connected to a Public Switched Telephone Network (PSTN) 120 and/or a packet switched network 122. The user devices may be POTS telephones, illustrated as user phone devices 110', 110", that communicate through the PSTN 120, and/or may be user network devices 112', 112" that communicate through the packet switched network 122 through a wired and/or radio access network 124. The one or more communication control nodes 100 include a user call profile repository 102, a routing controller(s) 104, and a web server 106.

Figure 6:
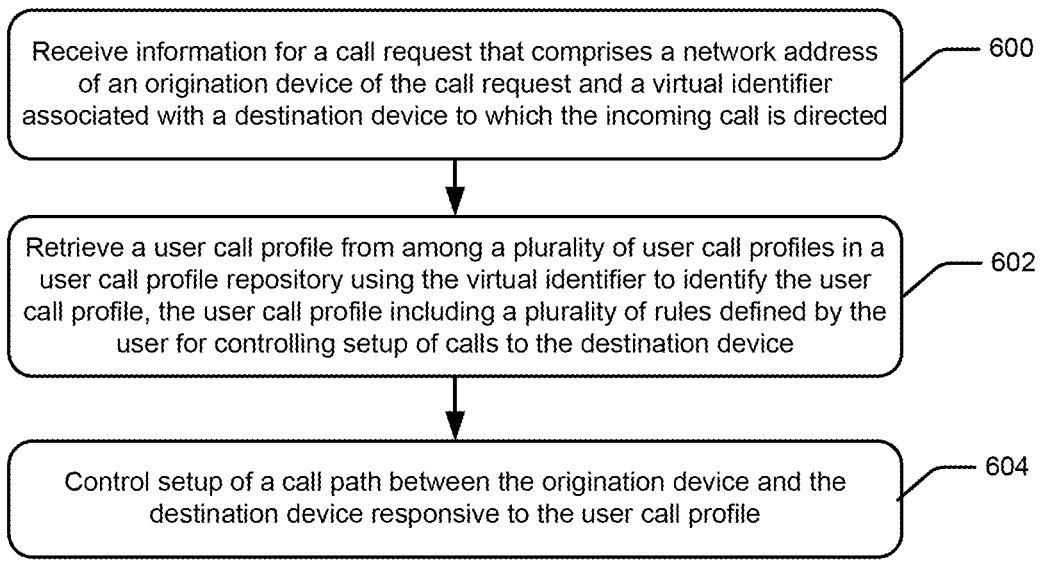
FIGS. 6-15 are flow charts that illustrate operations and methods by at least one network node for controlling setup of calls through a communications system in accordance with some embodiments.

FIG. 6 is a flow chart that illustrates operations and methods that can be performed by the routing controller 104 to control setup of a call through the communication system from an origination device to a destination device in response to a call request. The routing controller 104 receives (step 600) information for the call request that includes a network address of the origination device of the call request and a virtual identifier associated with the destination device to which the incoming call is directed. The routing controller 104 retrieves (step 602) a user call profile from among a plurality of user call profiles in the user call profile repository 102 using the virtual identifier to identify the user call profile. The user call profile includes a plurality of rules that have been defined by the user for controlling setup of calls to the destination device. The routing controller 104 then controls setup of a call path between the origination device and the destination device responsive to the user call profile.

Further operations and methods according to other embodiments are explained below with regard to each of four different example communication scenarios: 1) call setup from a POTS (standard) phone 110' to a POTS (standard) phone 110" through the PSTN 120; 2) call setup from a POTS (standard) phone 110' through the PSTN 120 and the packet switched network 122 to an application on a user network device 112'; 3) call setup from an application on a user network device 112' through the packet switched network 122 and the PSTN 120 to a POTS (standard) phone 110; and 4) call setup from an application on a user network device 112' through a packet switched network 122 to an application on another user network device 112".

Figure 2:
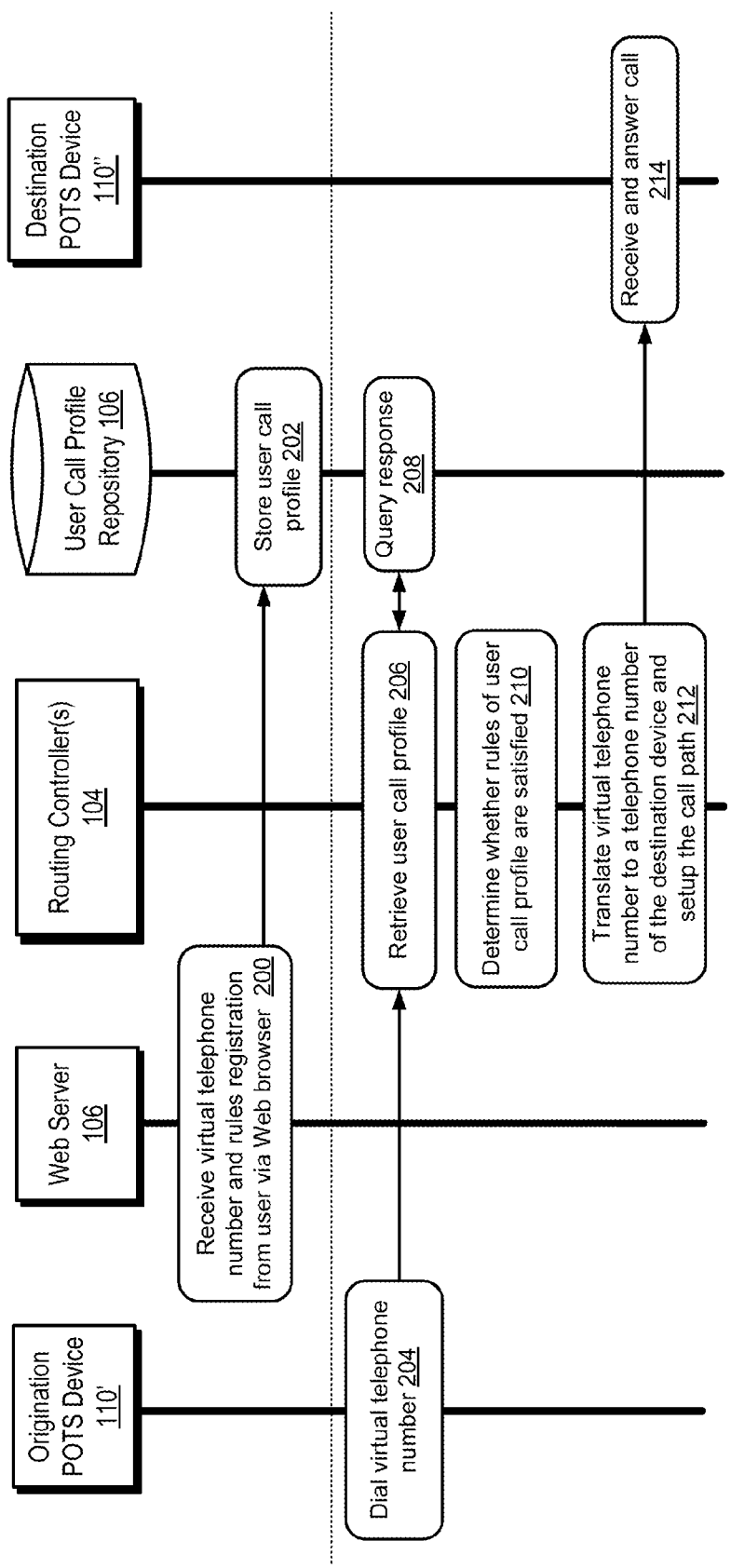
FIG. 2 is a flow chart that illustrates operations and methods for call setup from a standard phone to a standard phone through a public switched telephone network, in accordance with some embodiments.
Figure 14:
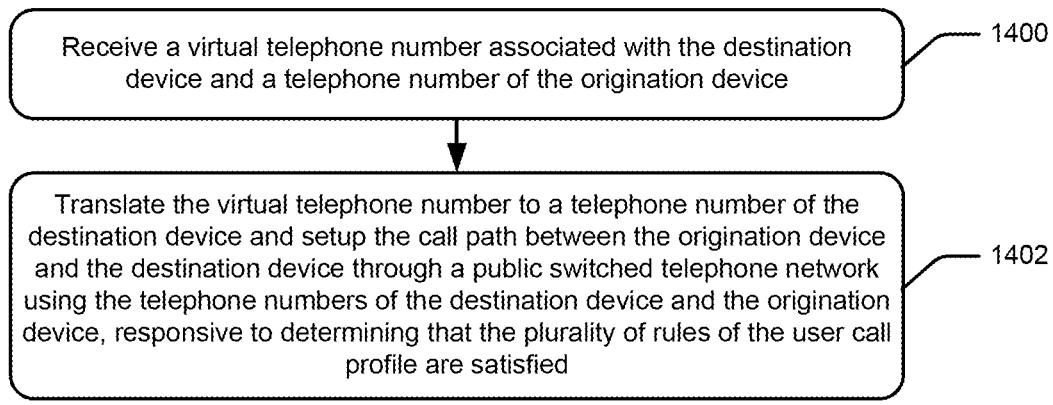

1) Call Handling From POTS (Standard) Phone to POTS (Standard) Phone:

FIGS. 2 and 14 are flow charts that illustrate operations and methods that can be performed by the control node 100 for call setup from an origination device 110', which is a POTS (standard) phone, through the PSTN 120 to a destination device 110", which is also a POTS (standard) phone.

Referring to FIGS. 1, 2, and 14, a subscriber or other authorized user can define one or more virtual telephone numbers or other virtual identifiers that can be used to call the user's device 110", and can define a user call profile that includes a plurality of rules which are used to control setup of calls to the user's device. The registration process can include the web server 106 receiving (step 200 of FIG. 2) a virtual telephone number and call handling rules from a user who is accessing the web server 106 via a web browser on a user device. The user call profile repository 102 receives and uses the virtual telephone number and the call handling rules to generate a user call profile that is stored (step 202 of FIG. 2) in the repository 102.

A person can attempt to call the user by dialing (step 204 of FIG. 2) a virtual telephone number through the origination device 110' to generate a call request that is communicated to the routing controller 104. The virtual telephone number is one of the one or more virtual telephone numbers that the user has registered with the user call profile in the repository 102.

The routing controller 104 receives (step 1400 of FIG. 14) the call request, which contains the virtual telephone number associated with the destination device 110" and a telephone number of the origination device 110'. The routing controller 104 responds to the call request by retrieving (step 206 of FIG. 2) the user call profile from the user call profile repository 102, such as via a query-response (step 208 of FIG. 2) database lookup operation using the virtual telephone number to identify the user call profile. The routing controller 104 determines (step 210 of FIG. 2) whether the rules that are defined by the user call profile are satisfied.

The call is setup in response to the rules being satisfied, by translating (step 212 of FIG. 2, step 1402 of FIG. 14) the virtual telephone number to a telephone number of the destination device 110" and setting-up the call path between the origination device 110' and the destination device 110" through the PSTN 120 using the telephone numbers of the destination device 110" and the origination device 110'. The user of the destination device 110" can thereby receive and answer (step 214 of FIG. 2) the call.

Figure 3:
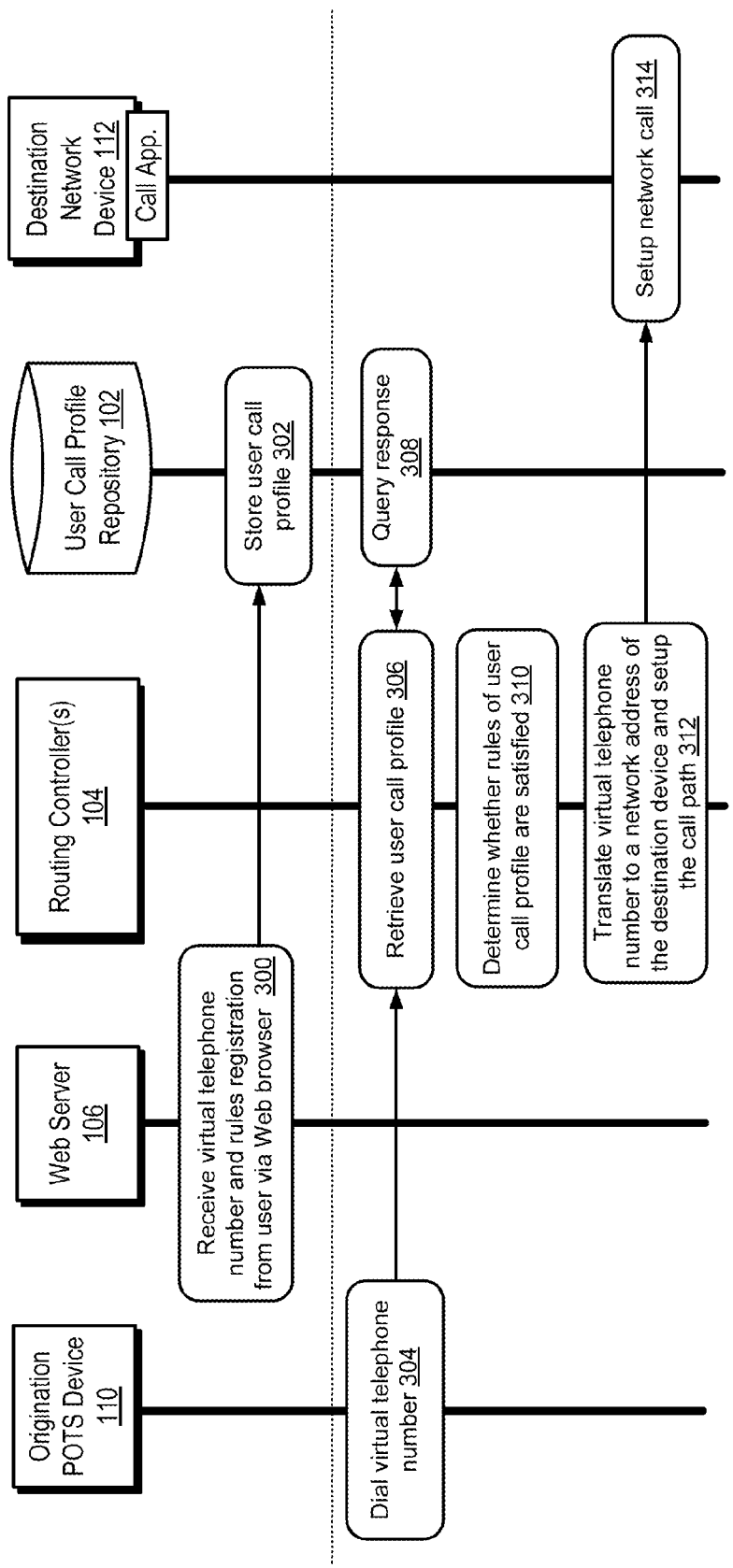
FIG. 3 is a flow chart that illustrates operations and methods for call setup from a standard phone through a public switched telephone network and a packet switched network to an application on a network device, in accordance with some embodiments.
Figure 13:
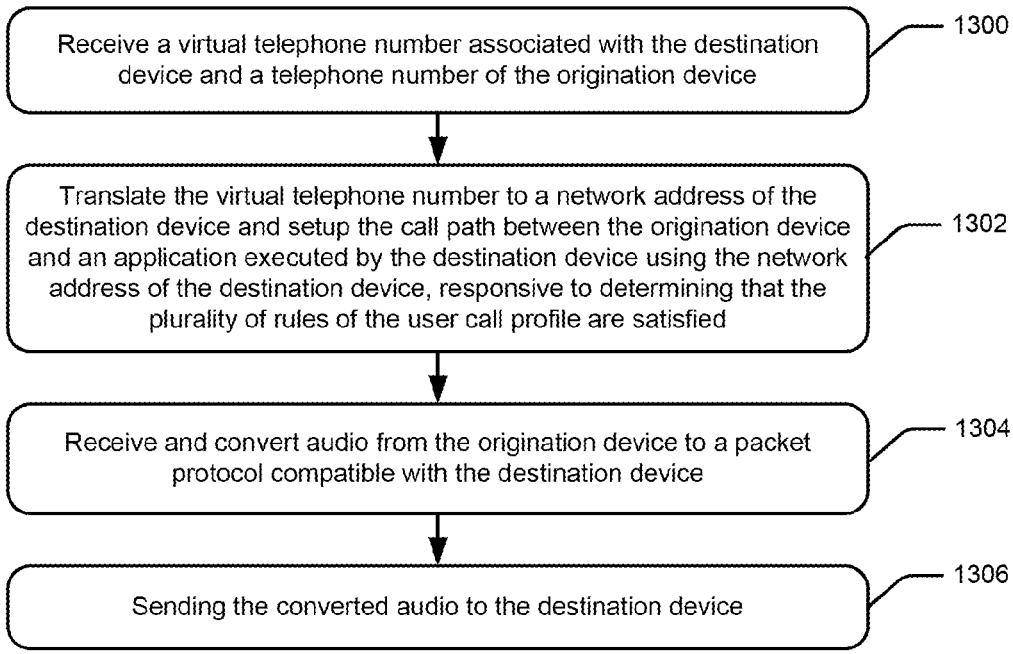

2) Call Handling from a POTS Phone to an Application on User Network Device:

FIGS. 3 and 13 are flow charts that illustrate operations and methods that can be performed by the control node 100 for call setup from an origination POTS (standard) phone 110' through the PSTN 120 and the packet switched network 122 to an application on a destination user network device 112'.

Referring to FIGS. 1, 3, and 13, a subscriber or other authorized user can define one or more virtual telephone numbers or other virtual identifiers that can be used to call an application on the user's network device 112', and can define a user call profile that includes a plurality of rules which are used to control setup of calls to the user's device. The registration process can include the web server 106 receiving (step 300 of FIG. 3) a virtual telephone number and call handling rules from a user who is accessing the web server 106 via a web browser on a user device. The user call profile repository 102 receives and uses the virtual telephone number and the call handling rules to generate a user call profile that is stored (step 302 of FIG. 3) in the repository 102.

A person can attempt to call the user by dialing (step 304 of FIG. 3) a virtual telephone number through the origination device 110' to generate a call request that is communicated to the routing controller 104. The virtual telephone number is one of the one or more virtual telephone numbers or other virtual identifiers that the user has registered with the user call profile in the repository 102.

The routing controller 104 receives (step 1300 of FIG. 13) the call request, which contains the virtual telephone number associated with the destination device 112' and a telephone number of the origination device 110'. The routing controller 104 responds to the call request by retrieving (step 306 of FIG. 3) the user call profile from the user call profile repository 102, such as via a query-response (step 308 of FIG. 3) database lookup operation using the virtual telephone number to identify the user call profile. The routing controller 104 determines (step 310 of FIG. 3) whether the rules that are defined by the user call profile are satisfied.

The call is setup in response to the rules being satisfied, by translating (step 312 of FIG. 3, step 1302 of FIG. 13) the virtual telephone number to a network address of the destination device 112' and setting-up the call path between the origination device 110' and an application executed by the destination device 112' using the network address of the destination device 112'. The user of the destination network device 112' can thereby receive and setup (step 314 of FIG. 3) the call using the application. While the call is ongoing, the routing controller 104 can receive and convert (step 1304 of FIG. 13) audio from the origination POTS device 110' to a packet protocol compatible with the destination network device 112', and send (step 1306 of FIG. 13) the converted audio to the destination network device 112'.

Figure 4:
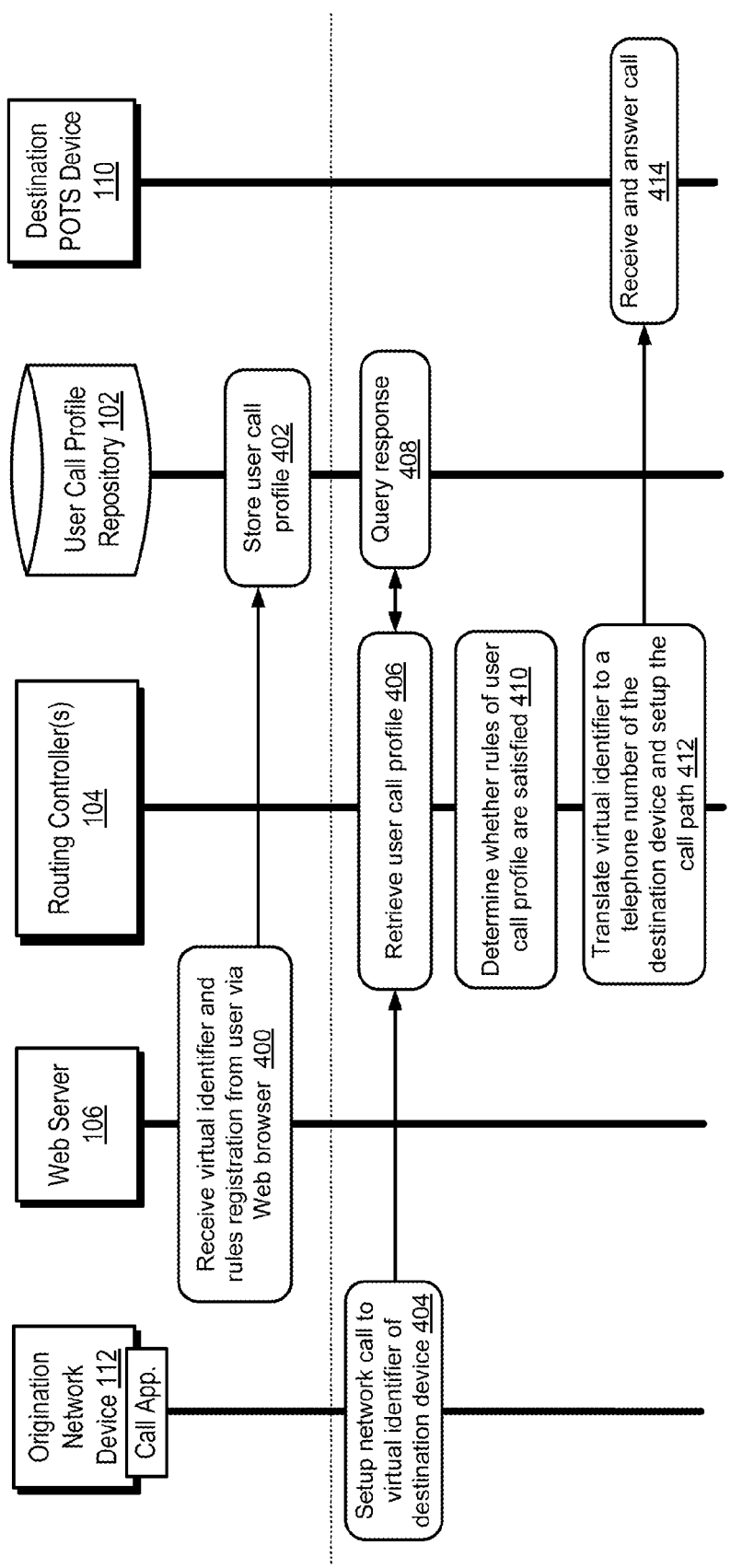
FIG. 4 is a flow chart that illustrates operations and methods for call setup from an application on a network device through a packet switched network and a public switched telephone network to a standard phone, in accordance with some embodiments.
Figure 12:
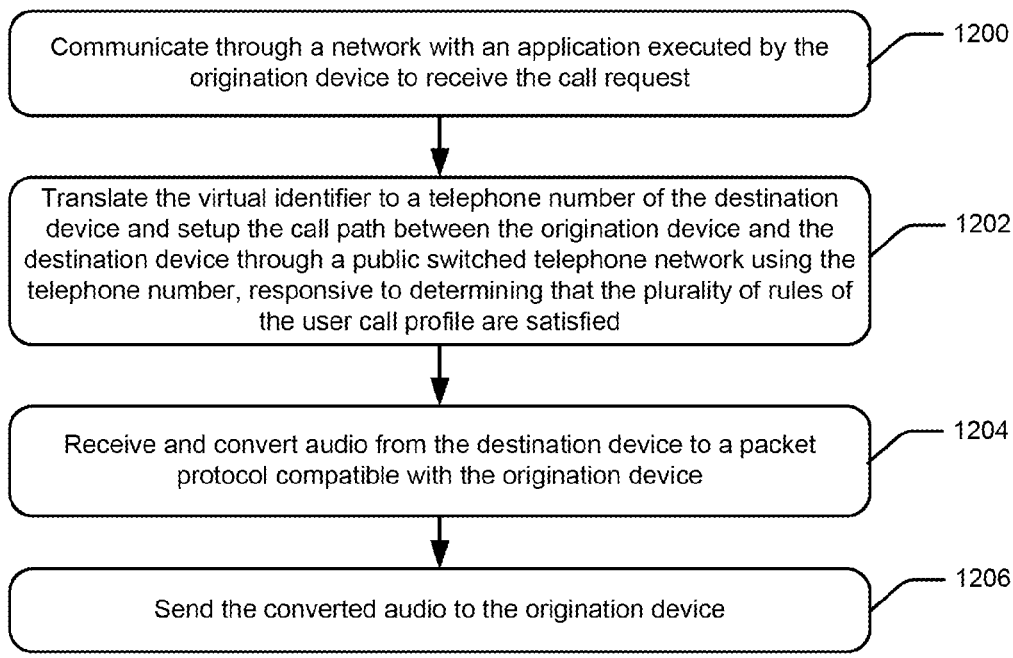

3) Call Handling from an Application on User Network Device to a POTS Phone:

FIGS. 4 and 12 are flow charts that illustrate operations and methods that can be performed by the control node 100 for call setup from an application on an origination user network device 112' through the packet switched network 122 and the PSTN 120 to a destination POTS (standard) phone 110'.

Referring to FIGS. 1, 4, and 12, a subscriber or other authorized user can define one or more virtual identifiers that can be used to call the user's POTS phone (device) 110', and can define a user call profile that includes a plurality of rules which are used to control setup of calls to the user's POTS phone 110'. A virtual identifier may include a virtual telephone number, a user name, or another identifier that another person will use to call the destination POTS phone 110'.

The registration process can include the web server 106 receiving (step 400 of FIG. 4) the virtual identifier and call handling rules from a user who is accessing the web server 106 via a web browser on a user device. The user call profile repository 102 receives and uses the virtual identifier and the call handling rules to generate a user call profile that is stored (step 402 of FIG. 4) in the repository 102.

A person can attempt to setup a call by operating an application that is executed by the origination user network device 112' (step 404 of FIG. 4) to generate a call request containing a virtual identifier which is communicated to the routing controller 104. The virtual identifier is one of the one or more virtual identifiers that the user has registered with the user call profile in the repository 102.

The routing controller 104 receives the call request by communicating (step 1200 of FIG. 12) with the application of the user network device 112' through the packet switched network 122. The call request contains the virtual identifier associated with the destination device 112' to which the call is directed, and a network address of the origination device 110'. The routing controller 104 responds to the call request by retrieving (step 406 of FIG. 4) the user call profile from the user call profile repository 102, such as via a query-response (step 408 of FIG. 4) database lookup operation using the virtual identifier to identify the user call profile. The routing controller 104 determines (step 410 of FIG. 4) whether the rules that are defined by the user call profile are satisfied.

The call is setup in response to the rules being satisfied, by translating (step 412 of FIG. 4, step 1202 of FIG. 12) the virtual identifier to a telephone number of the destination POTS phone 110' and setting-up the call path using the network address of the origination network device 112' and the telephone number of the destination POTS phone 110', via the packet switched network 122 and the PSTN 120.

The user of the destination POTS phone 110' can thereby receive and answer (step 414 of FIG. 4) the call. While the call is ongoing, the routing controller 104 can receive and convert (step 1204 of FIG. 12) audio from the destination POTS phone 110' to a packet protocol compatible with the origination network device 112', and send (step 1206 of FIG. 12) the converted audio to the origination network device 112'.

Figure 5:
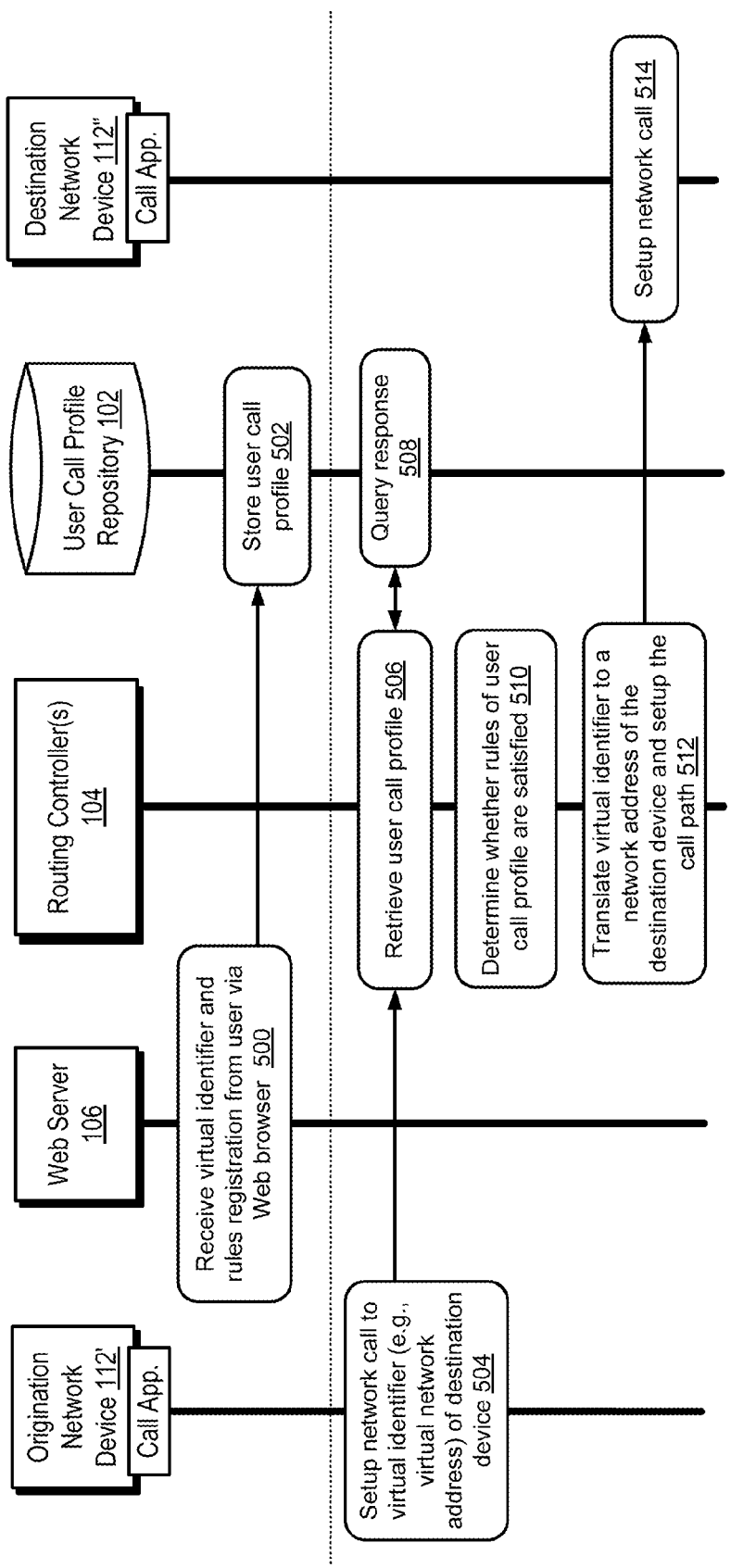
FIG. 5 is a flow chart that illustrates operations and methods for call setup from an application on a network device through a packet switched network to an application on another network device, in accordance with some embodiments.
Figure 15:
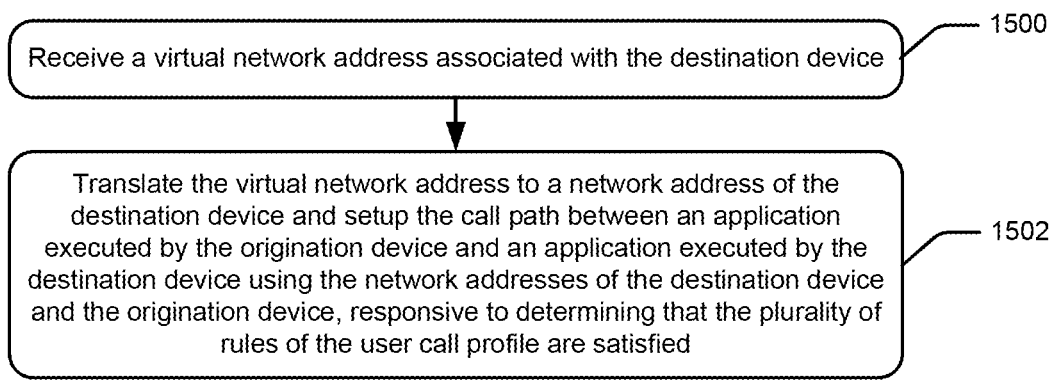

4) Call Handling from an Application on User Network Device to an Application on Another User Network Device:

FIGS. 5 and 15 are flow charts that illustrate operations and methods that can be performed by the control node 100 for call setup from an application on an origination user network device 112' through the packet switched network 122 to an application on a destination user network device 112".

Referring to FIGS. 1, 5, and 15, a subscriber or other authorized user can define one or more virtual identifiers that can be used to call the application on the destination user network device 112", and can define a user call profile that includes a plurality of rules which are used to control setup of calls to the user network device 112". A virtual identifier may include a virtual network address, a telephone number, a user name, or another identifier that another person will use to call the destination user network device 112". The registration process can include the web server 106 receiving (step 500 of FIG. 5) the virtual identifier and call handling rules from a user who is accessing the web server 106 via a web browser on a user device. The user call profile repository 102 receives and uses the virtual identifier and the call handling rules to generate a user call profile that is stored (step 502 of FIG. 5) in the repository 102.

A person can attempt to setup a call by operating an application that is executed by the origination user network device 112' (step 504 of FIG. 5) to generate a call request containing a virtual identifier which is communicated to the routing controller 104. The virtual identifier is one of the one or more virtual identifiers that the user has registered with the user call profile in the repository 102.

The routing controller 104 receives the call request (step 1500 of FIG. 15) from the application of the origination user network device 112' through the packet switched network 122. The call request contains the virtual identifier associated with the destination user network device 112" to which the call is directed, and a network address of the origination user network device 112'. The routing controller 104 responds to the call request by retrieving (step 506 of FIG. 5) the user call profile from the user call profile repository 102, such as via a query-response (step 508 of FIG. 5) database lookup operation using the virtual identifier to identify the user call profile. The routing controller 104 determines (step 510 of FIG. 5) whether the rules that are defined by the user call profile are satisfied.

The call is setup in response to the rules being satisfied, by translating (step 512 of FIG. 5, step 1502 of FIG. 15) the virtual identifier (e.g., a virtual network address for the destination user network device 112") to an actual network address for the destination user network device 112", and setting-up the call path using the network address of the origination network device 112' and the actual network address for the destination user network device 112", via the packet switched network 122. The user of the destination network device 112' can thereby receive and setup (step 514 of FIG. 5) the call using the application.

Call Setup Operations Controlled Responsive to User Call Profile:

FIGS. 7-11 are flow charts that illustrate operations and methods by at least one network node (e.g., the routing controller 104) for controlling setup of calls through a communications system in response to rules that are defined by a user call profile.

Figure 7:
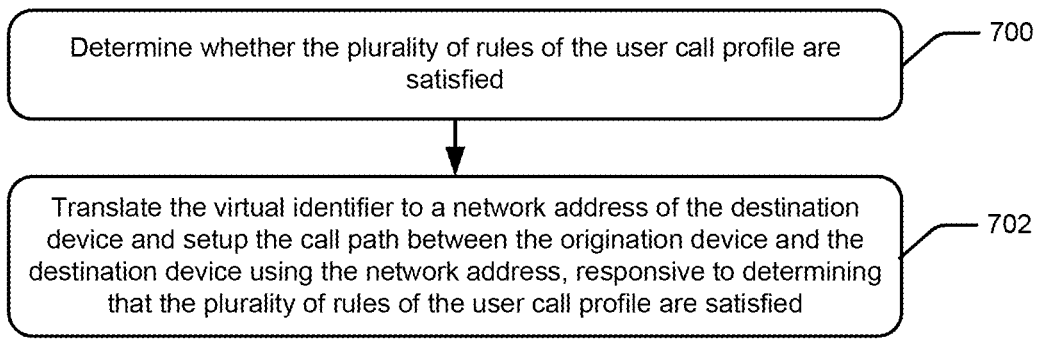

Referring to FIG. 7, setup of the call path between the origination device and the destination device is controlled responsive to the user call profile. A determination is performed (step 700) whether the plurality of rules of the user call profile are satisfied and, when satisfied, the virtual identifier is translated (step 702) to a network address of the destination device and the call path is setup between the origination device and the destination device using the network address.

The network address may correspond to a telephone number that is used to setup a call through the PSTN 120 and/or Internet or other data network address that is used to setup a call through the packet switched network 122.

Figure 8:
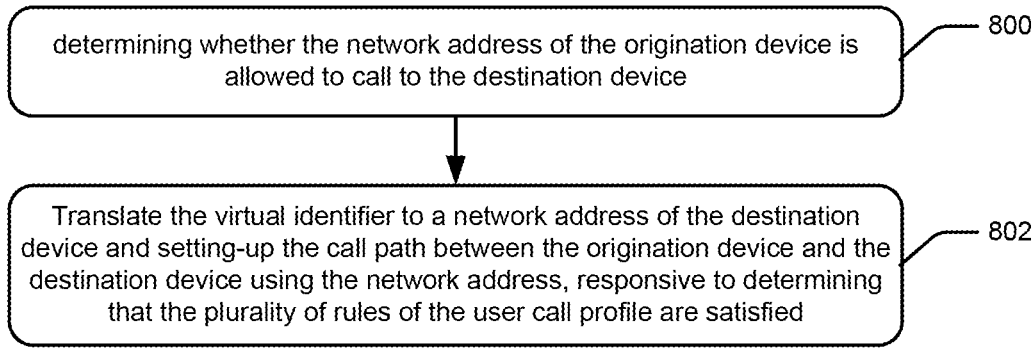

In a further embodiment, the user call profile can define network addresses that are blacklisted/whitelisted. Referring to FIG. 8, setup of the call path between the origination device and the destination device is controlled in response to a determination (step 800) of whether the network address of the origination device is allowed to call to the destination device. When the network address of the origination device is allowed to call to the destination device and any other rules are satisfied, the virtual identifier is translated (step 802) to the network address of the destination device and the call path is setup between the origination device and the destination device using the network address.

Figure 9:
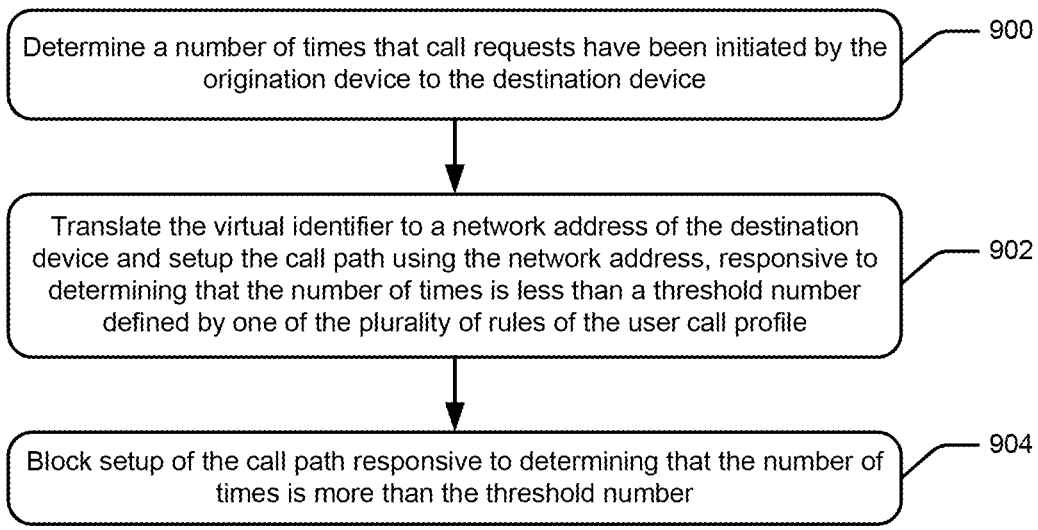

In an alternative embodiment, the user call profile limits the number of times that a defined person can call the destination device using the virtual identifier that was provided to that person. Referring to FIG. 9, setup of the call path between the origination device and the destination device is controlled in response to a determination (step 900) of a number of times that call requests have been initiated by the origination device to the destination device. In response to determining that the number of times is less than a threshold number defined by one of the plurality of rules of the user call profile, the virtual identifier is translated (step 902) to a network address of the destination device and the call path is setup using the network address. In contrast, setup of the call path is blocked (step 904) in response to determining that the number of times is more than the threshold number.

Figure 10:
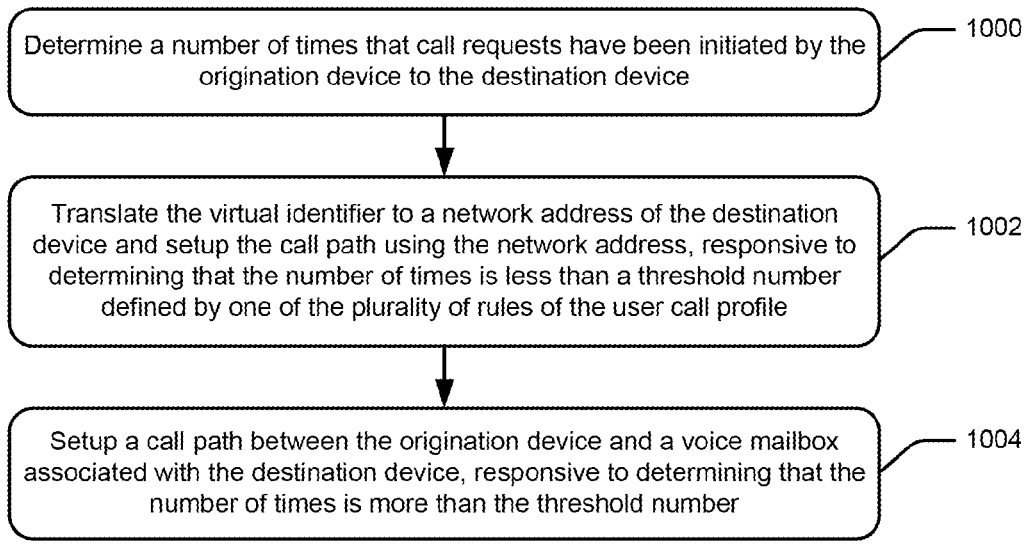

In an alternative embodiment, the user call profile causes calls from a defined person to automatically be routed to voice mail when a defined threshold number of calls have been received from that person (e.g., to restrict certain callers to having ring-through privileges only a certain number of times). Referring to FIG. 10, setup of the call path between the origination device and the destination device is controlled in response to a determination (step 1000) of a number of times that call requests have been initiated by the origination device to the destination device. In response to determining that the number of times is less than a threshold number defined by one of the plurality of rules of the user call profile, the virtual identifier is translated (step 1002) to a network address of the destination device and the call path is setup using the network address. In contrast, a call path is setup (step 1004) between the origination device and a voice mailbox associated with the destination device in response to determining that the number of times is more than the threshold number.

Figure 11:
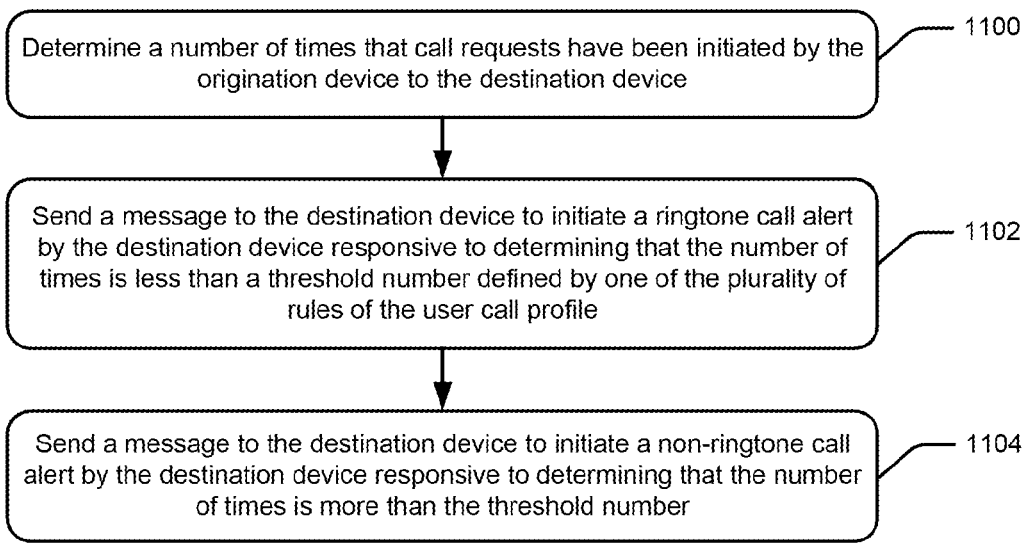

In an alternative embodiment, the user call profile causes a non-ringtone alert to be initiated through the destination device when a defined threshold number of calls have been received from a defined person (e.g., restrict certain callers to having ring-through privileges only a certain number of times). Referring to FIG. 11, setup of the call path between the origination device and the destination device is controlled in response to a determination (step 1100) of a number of times that call requests have been initiated by the origination device to the destination device. In response to determining that the number of times is less than a threshold number defined by one of the plurality of rules of the user call profile, a message is sent (step 1102) to the destination device to initiate a ringtone call alert by the destination device. In contrast, a message is sent (step 1104) to the destination device to initiate a non-ringtone call alert by the destination device responsive to determining that the number of times is more than the threshold number.

Call Setup Control Operations by a User Device:

Various embodiments have been described above in the context of a network node, such as the routing controller 104, controlling setup of calls through the communication system. However, one or more of the operations that have been described herein as being performed by a network node may alternatively or additionally be performed by a user device (e.g., the user devices 110', 110", 112', 112")

Figure 16:
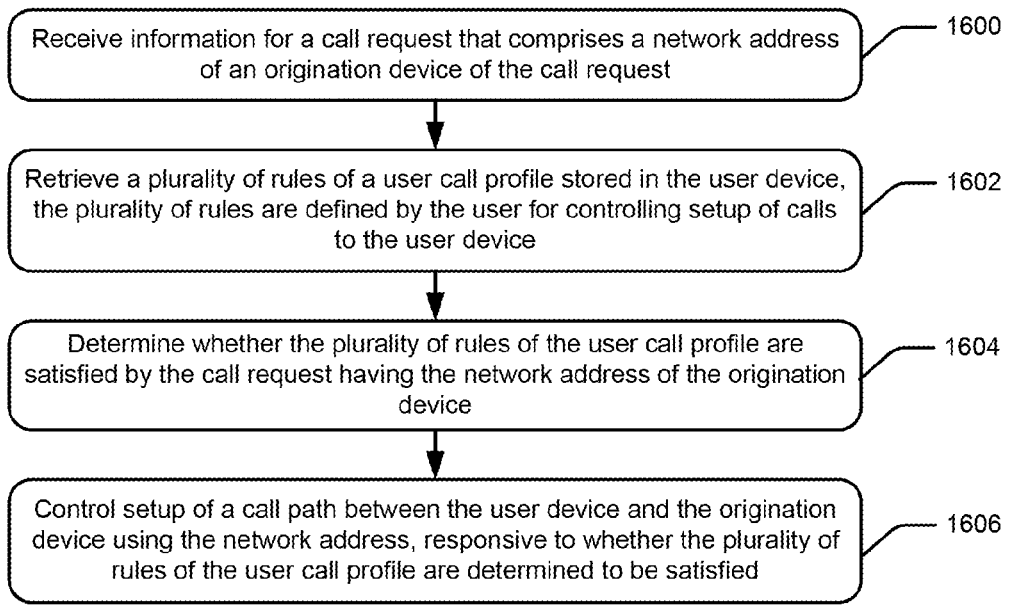
FIG. 16 is a flow chart that illustrates operations and methods by a user device for controlling setup of calls through a communications system in accordance with some embodiments.

FIG. 16 is a flow chart that illustrates operations and methods by a user device for controlling setup of calls through a communications system in accordance with some embodiments. Information is received (step 1600) for a call request that comprises a network address of an origination device of the call request. A plurality of rules of a user call profile, which are stored in the user device, are retrieved (step 1602). The plurality of rules are defined by the user for controlling setup of calls to the user device. A determination is performed (step 1604) as to whether the plurality of rules of the user call profile are satisfied by the call request having the network address of the origination device. Setup of a call path between the user device and the origination device using the network address is controlled (step 1606), responsive to determining that the plurality of rules of the user call profile are satisfied.

In a further embodiment, the user call profile limits the number of times that a defined person can call the destination device using the virtual identifier that was provided to that person. More particularly, setup of the call path between the user device and the origination device using the network address is controlled in response to a determination of a number of times that call requests have been initiated by the origination device to the user device. The call path is setup using the network address in response to determining that the number of times is less than a threshold number defined by one of the plurality of rules of the user call profile. In contrast, setup of the call path is blocked responsive to determining that the number of times is more than the threshold number.

In an alternative embodiment, the user call profile causes calls from a defined person to automatically be routed to voice mail when a defined threshold number of calls have been received from that person (e.g., to restrict certain callers to having ring-through privileges only a certain number of times). More particularly, setup of a call path between the user device and the origination device using the network address is controlled in response to a determination of a number of times that call requests have been initiated by the origination device to the user device. A call path is setup using the network address in response to determining that the number of times is less than a threshold number defined by one of the plurality of rules of the user call profile. In contrast, a call path between the origination device and a voice mailbox associated with the user device is setup in response to determining that the number of times is more than the threshold number.

Example Network Node and User Device

Figure 17:
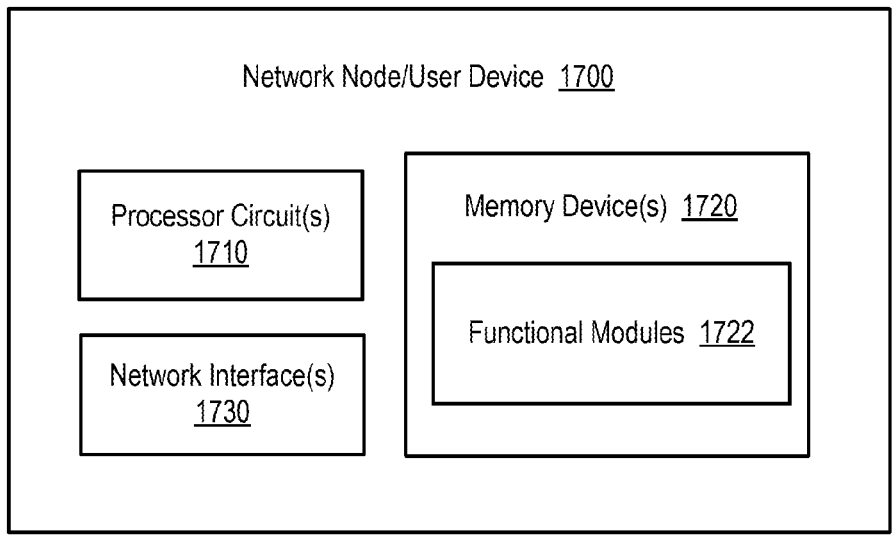
FIG. 17 is a block diagram of a network node and/or user device in accordance with some embodiments.

FIG. 17 is a block diagram of a network node and/or user device 1700 in accordance with some embodiments. When used for a network node, the illustrated components may be included in the network node 100, the user call profile repository 102, the routing controller 104, the web server 106, and/or other components of the communication system. The used for a user device, the illustrated components may be included in the user phone device 110 and/or the user network device 112.

The user network device 112 can be any type of electronic communication device that can operated by a user to initiate or receive calls, and may include, but is not limited to, fixed/mobile/transportable terminals (e.g., smart phones, tablet computers, etc.), televisions, gaming consoles, and desktop computers.

The network node/user device 1700 includes a processor circuit 1710, memory circuitry/devices 1720, and one or more network interfaces 1730. The one or more network interfaces 1730 can include any type of wired and/or wireless communication interface (e.g., cellular, wireless local area network, wireless metropolitan area network, etc.).

The processor circuit 1710 may include one or more data processing circuits, such as a general purpose and/or special purpose processor (e.g., microprocessor and/or digital signal processor). The processor circuit 1710 is configured to execute computer program instructions from functional modules 1722 in the memory devices 1720, described below as a computer readable medium, to perform some or all of the operations and methods that are described above for one or more of the embodiments disclosed herein, such as the embodiments of FIGS. 1-16.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the non-transitory computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by at least one network node for controlling setup of calls through a communication system, the method comprising:
   registering a plurality of publicly disclosed virtual identifiers defined by an individual user that are mapped to a network address of a destination device associated with the user;
   associating a plurality of user call profiles for the user, each user call profile corresponding to a respective one of the user-defined virtual identifiers, wherein a user call profile contains a plurality of call handling rules defined by the user with respect to a particular virtual identifier;
   receiving information for a call request relative to an incoming call that comprises a network address of an origination device of the call request and a specific one of the virtual identifiers associated with the destination device to which the incoming call is directed;
   selecting a specific user call profile from among the plurality of user call profiles of the user in a user call profile repository using the specific virtual identifier to identify the specific user call profile; and
   controlling setup of a call path between the origination device and the destination device responsive to the specific user call profile, wherein controlling setup of the call path comprises:
      determining whether the plurality of call handling rules of the specific user call profile are satisfied; and
      translating the specific virtual identifier to the network address of the destination device and setting-up the call path between the origination device and the destination device using the network address, responsive to determining that the plurality of call handling rules of the specific user call profile are satisfied.

2. The method of claim 1, wherein controlling setup of the call path between the origination device and the destination device responsive to the specific user call profile, further comprises:
   determining a number of times that call requests have been initiated by the origination device to the destination device;
   translating the specific virtual identifier to the network address of the destination device and setting-up the call path using the network address, responsive to determining that the number of times is less than a threshold number defined by one of the plurality of call handling rules of the specific user call profile; and
   blocking setup of the call path responsive to determining that the number of times is more than the threshold number.

3. The method of claim 1, wherein controlling setup of the call path between the origination device and the destination device responsive to the specific user call profile, further comprises:
   determining a number of times that call requests have been initiated by the origination device to the destination device;
   translating the specific virtual identifier to the network address of the destination device and setting-up the call path using the network address, responsive to determining that the number of times is less than a threshold number defined by one of the plurality of call handling rules of the specific user call profile; and setting-up a call path between the origination device and a voice mailbox associated with the destination device, responsive to determining that the number of times is more than the threshold number.

4. The method of claim 1, wherein controlling setup of the call path between the origination device and the destination device responsive to the specific user call profile, further comprises:

determining a number of times that call requests have been initiated by the origination device to the destination device;

sending a message to the destination device to initiate a ringtone call alert by the destination device responsive to determining that the number of times is less than a threshold number defined by one of the plurality of call handling rules of the specific user call profile; and sending a message to the destination device to initiate a non-ringtone call alert by the destination device responsive to determining that the number of times is more than the threshold number.

5. A network node comprising:

a web server interface operative for facilitating registering a plurality of publicly disclosed virtual identifiers defined by an individual user that map to a network address of a destination device associated with the user;

a user call profile repository operative for storing and associating a plurality of user call profiles for the user, each user call profile corresponding to a respective one of the user-defined virtual identifiers, wherein a user call profile contains a plurality of call handling rules defined by the user with respect to a particular virtual identifier;

a network interface configured to communicate through at least one network to receive information for a call request relative to an incoming call that comprises a network address of an origination device of the call request and a specific one of the virtual identifiers associated with the destination device to which the incoming call is directed; and a processor circuit configured to:

select a specific user call profile from among a plurality of user call profiles of the user in the user call profile repository using the specific virtual identifier to identify the specific user call profile; and control setup of a call path between the origination device and the destination device through a communication system responsive to the specific user call profile, wherein controlling setup of the call path comprises:

determining whether the plurality of call handling rules of the specific user call profile are satisfied; and translating the specific virtual identifier to the network address of the destination device and setting-up the call path between the origination device and the destination device using the network address, responsive to determining that the plurality of call handling rules of the specific user call profile are satisfied.

6. The network node of claim 5, wherein the processor is further configured to:

determine a number of times that call requests have been initiated by the origination device to the destination device;

translate the specific virtual identifier to the network address of the destination device and setting-up the call path using the network address, responsive to determining that the number of times is less than a threshold number defined by one of the plurality of call handling rules of the specific user call profile; and block setup of the call path responsive to determining that the number of times is more than the threshold number.

7. The network node of claim 5, wherein the processor is further configured to:

determine a number of times that call requests have been initiated by the origination device to the destination device;

translate the specific virtual identifier to the network address of the destination device and setting-up the call path using the network address, responsive to determining that the number of times is less than a threshold number defined by one of the plurality of call handling rules of the specific user call profile; and setup a call path between the origination device and a voice mailbox associated with the destination device, responsive to determining that the number of times is more than the threshold number.

* * * * *